Patented July 14, 1925.

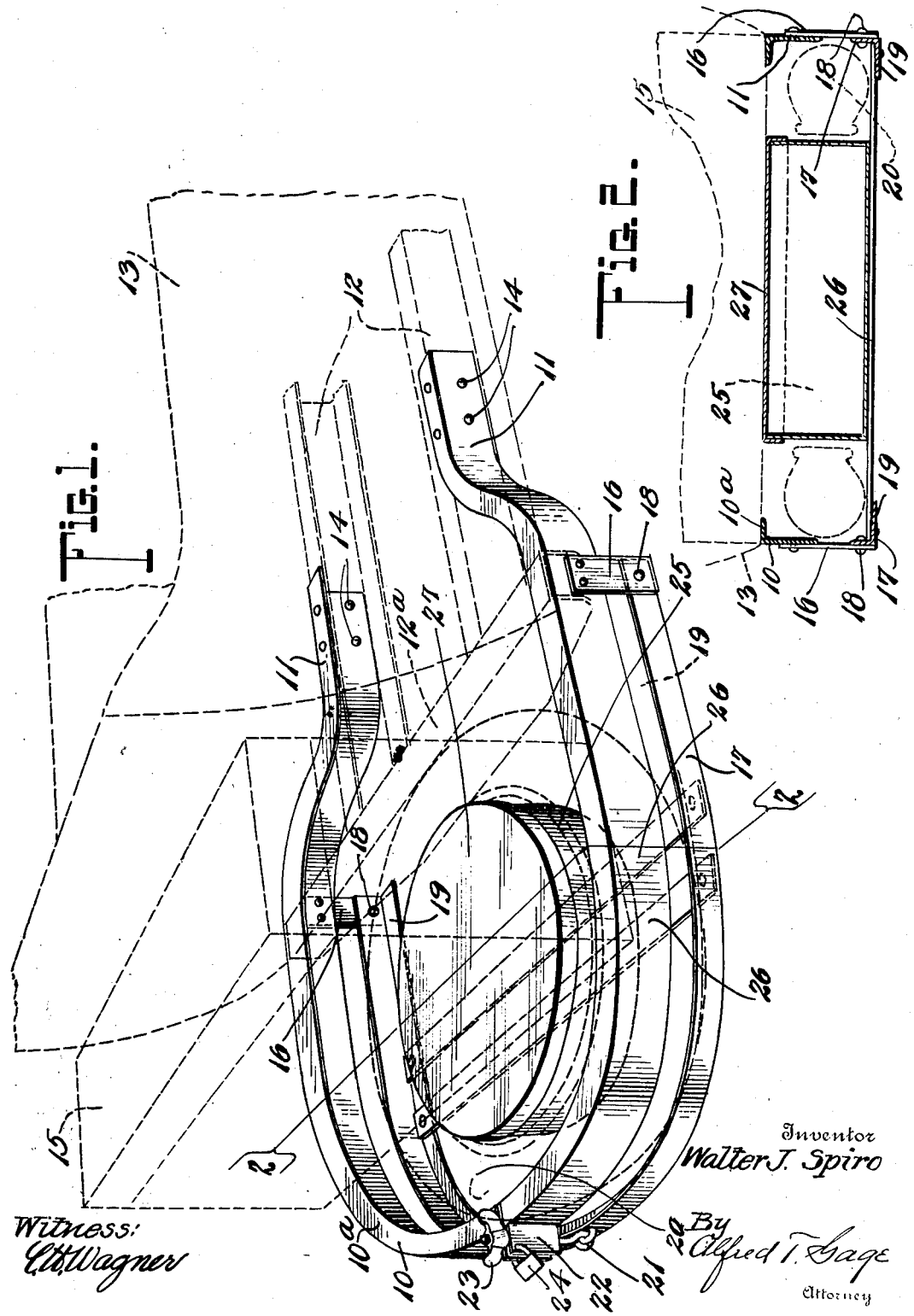

1,545,798

UNITED STATES PATENT OFFICE.

WALTER J. SPIRO, OF WHITE PLAINS, NEW YORK.

TRUNK AND TIRE CARRIER.

Application filed May 10, 1924. Serial No. 712,273.

*To all whom it may concern:*

Be it known that I, WALTER J. SPIRO, citizen of the United States, residing at White Plains, in the county of Westchester and State of New York, have invented certain new and useful Improvements in Trunk and Tire Carriers, of which the following is a specification.

This invention relates to a trunk and tire carrier and particularly to a construction adapted for application at the rear of a motor vehicle.

The invention has for an object to provide a novel and improved construction wherein the supporting frame for the trunk forms a cooperating member for a tire holder pivoted beneath the frame so that the tire is supported and protected by these members but rendered readily accessible when needed.

A further object of the invention is to present a new structure of trunk frame which provides a rigid bumper carrying a swinging tire holder having a tool receptacle thereon so disposed as to be concealed and protected by the trunk upon the frame.

Another object of the invention is to form both the trunk frame and tire holder of L-shaped angle iron and of curved configuration to provide supporting flanges at opposite sides of the tire when in position within the holder.

Other and further objects and advantages of the invention will be hereinafter set forth and the novel features thereof defined by the appended claims.

In the drawing—

Figure 1 is a perspective showing the invention applied; and

Figure 2 is a cross section thereof, on line 2—2 of Fig. 1.

Like numerals refer to like parts in the several figures of the drawing.

The carrier frame 10 may be of any desired configuration, but is preferably formed substantially U-shaped and of L-angle iron as herein shown. The curved face thereof provides a bumper and may be formed of a shape found most convenient for that purpose. The free ends 11 of the frame are substantially parallel so that the angle walls thereof fit closely against the top and side faces of the chassis frame 12 and are disposed beneath the body 13 mounted thereon so as to rest upon the ends 12ª of the cross bar of the frame. These parts are firmly secured together by any desired means, such as fastening devices 14, and the upper face of the frame provides a support for a trunk or container 15 which may be permanently or detachably secured thereto. It will be obvious that the frame may be used for other supporting purposes if a trunk is not desired thereon.

The frame 10 is provided with depending pivoting lugs 16 intermediate its ends upon which a tire carrier 17 is mounted at 18 and adapted to swing downwardly therefrom. This carrier is curved to conform to the frame and formed of angle iron so that the lower or horizontal flange 19 thereof forms a support for the tire 20 and cooperates with the horizontal flange 10ª of the frame in retaining the tire in position. The tire carrier is secured to the frame when in closed position by any suitable device, for instance a bolt 21 pivoted thereto and adapted to lie between the keepers 22 upon the frame. This bolt carries a wing nut 23 to engage the end of the keepers by which the parts may be drawn tightly into closed position, and secured by a suitable lock 24 applied to these keepers.

The free end of the bolt 21 may be headed to prevent removal of the nut.

The space within the tire may be utilized for a tool box or receptacle 25 which is herein shown as supported upon the tire carrier by cross bars 26 so that it is rendered accessible when the carrier is released to remove the tire. The receptacle is also provided with a detachable cover 27 which under normal conditions lies beneath the trunk and cannot be removed except by a release of the pivoted carrier.

The operation of the invention will be apparent from the foregoing description from which it will be seen that a rigid trunk supporting frame and bumper is provided and forms a member of the tire carrier so that the tire is securely held and protected but is quickly and readily accessible when needed. The space beneath the trunk frame is thus utilized for both the tire and tool receptacle and such accessories removed from the side or rear of the vehicle. The trunk when secured to the frame prevents any access to the receptacle or tire while the frame construction is adapted to retain the tire in position without the use of other supporting means. The downward swing of the tire holder presents the tire in most convenient position for quick removal and replacement.

The specific construction of the invention has been shown and described but the invention is not confined thereto as changes and alterations may be made therein without departing from the spirit of the invention as expressed in the following claims.

What I claim is:—

1. In a trunk and tire carrier, a fixed frame adapted to support a trunk, and a tire holder pivoted to said frame to swing downwardly therefrom.

2. In a trunk and tire carrier, a fixed frame adapted to support a trunk, a tire holder pivoted to said frame to swing downwardly therefrom, and a receptacle supported centrally of said holder to lie within a tire carried thereby.

3. In a trunk and tire carrier, a rigidly supported trunk supporting frame having free ends for attachment to a vehicle and an intermediate rearwardly projected portion forming a bumper, and a tire holder conforming to the rear of said bumper portion and pivotally connected to said frame at its end next the vehicle.

4. In a trunk and tire carrier, a rigidly supported trunk supporting frame having free ends for attachment to a vehicle and an intermediate bumper portion, a tire holder conforming to the rear of said bumper portion and pivotally connected to said frame at its forward end, and means for detachably securing the rear portion of said holder to said frame.

5. In a trunk and tire carrier, a trunk supporting frame having free ends for attachment to a vehicle and an intermediate bumper portion, a tire holder pivotally connected to said frame at its forward end, a bolt provided with a securing nut and pivoted upon said holder, and keepers upon the frame to receive said bolt and engage said nut.

6. In a trunk and tire carrier, a fixed frame adapted to support a trunk, a tire holder pivoted to said frame to swing downwardly therefrom, cross supports carried by said holder, and a receptacle mounted upon said supports centrally of the holder.

7. In a trunk and tire carrier, a substantially U-shaped frame formed of angle iron and having its free ends adapted to embrace a member of a vehicle frame, and a U-shaped tire holder pivotally supported at its open ends upon the angle-iron frame.

8. In a trunk and tire carrier, a substantially U-shaped frame formed of angle iron and having its free ends secured to a fixed part, and a curved tire holder formed of angle iron with a horizontal supporting flange and pivotally mounted at its inner portion to the U-shaped frame to swing downwardly therefrom.

9. In a trunk and tire carrier, a trunk supporting frame formed of angle iron with a horizontal flange, and an angle iron tire carrier pivoted to swing beneath the frame and formed with a flange adapted to lie parallel with the frame flange to support and retain a tire intermediate of said flanges.

10. In a trunk and tire carrier, a fixed frame, a container mounted thereon, a tire holder movably mounted upon said frame to support a tire beneath the same, and a receptacle carried by said holder beneath the container when the parts are in closed position.

In testimony whereof I affix my signature.

WALTER J. SPIRO.